Figure 1:
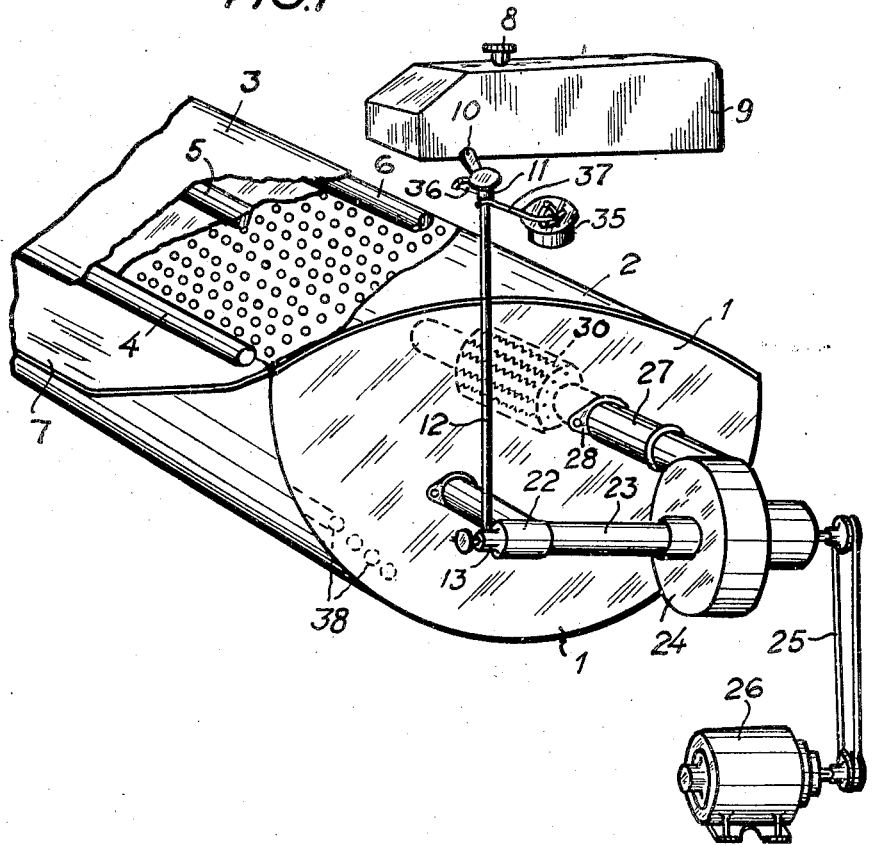

Dec. 27, 1949     K. E. BERGGREN     2,492,781
APPARATUS FOR THE DEVELOPMENT OF
PRINTS BY MEANS OF AMMONIA GAS

Filed Oct. 24, 1945     2 Sheets-Sheet 1

INVENTOR.
Kurt Erik Berggren
BY
Singer, Ehlert, Stern & Carlberg
ATTORNEY

Dec. 27, 1949 K. E. BERGGREN 2,492,781
APPARATUS FOR THE DEVELOPMENT OF
PRINTS BY MEANS OF AMMONIA GAS
Filed Oct. 24, 1945 2 Sheets-Sheet 2
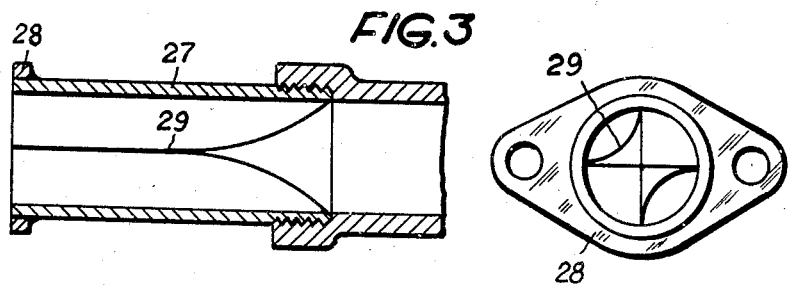
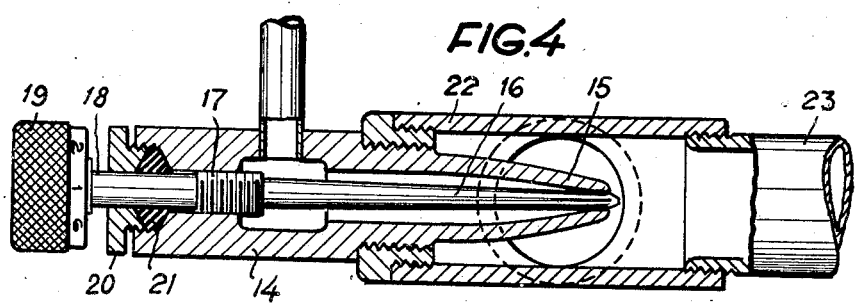
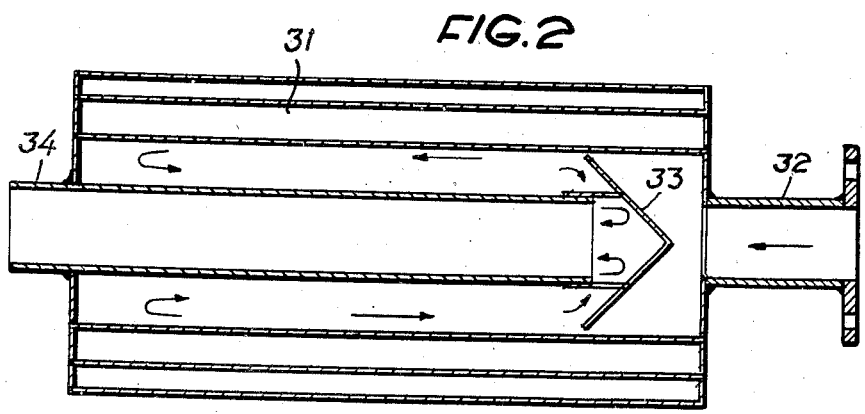
INVENTOR.
Kurt Erik Berggren
BY
Singer, Ehlert, Stern & Carlberg
ATTORNEY Patented Dec. 27, 1949

2,492,781

UNITED STATES PATENT OFFICE 2,492,781

APPARATUS FOR THE DEVELOPMENT OF PRINTS BY MEANS OF AMMONIA GAS

Kurt Erik Berggren, Stockholm, Sweden

Application October 24, 1945, Serial No. 624,154
In Sweden June 13, 1944

5 Claims. (Cl. 95—89)

The present invention relates to an apparatus for the development of sensitized paper by means of ammonia gas produced from commercial caustic ammonia by finely dividing the latter.

In hitherto known apparatus of this kind, it has not been found possible to regulate with certainty the proportion between the amount of aqueous vapor and of gaseous ammonia. This, however, has been a very great drawback, as ammonia gas with an unduly low content of water vapor will not produce a satisfactory development of prints. Nor is an excessively high content of water vapor suitable, seeing that water may then be condensed on the prints, which will then shrink or turn yellow.

The present invention is intended to obviate these drawbacks, which is attained in the following manner. The minutely divided caustic ammonia is first transmitted by a current of air through a superheater, where the minute drops of water produced by the fine division are vaporized before the resulting mixture of air, ammonia gas and water vapor enters a chamber where the prints are to be developed. In this way a constant proportion between the gaseous ammonia and water vapor is obtained, since all the water in the caustic ammonia will be effectively vaporized. In fact, the resulting content of water vapor in the ammonia gas has been found to be ideal for the development of printing paper provided with a sensitive film of diazo compounds. Moreover, by thus somewhat superheating the mixture of ammonia gas and water vapor, one guards against the precipitation of condensate on the parts over which the printing paper passes.

An apparatus adapted for the execution of this process is shown in the accompanying drawings, where Fig. 1 is a perspective view of one end of the developing apparatus and Figs. 2, 3 and 4 are details on an enlarged scale.

The apparatus consists of a large box-shaped part 1 provided at the top with an upwardly arched plate 2, which is perforated with holes arranged relatively to one another in the way explained below. The said plate 2, which should preferably be made of stainless material, is covered by an endless conveying cloth 3, made of rubber or other material suitable for the purpose and passing over three rollers 4, 5 and 6. The rollers 4 and 6 are situated at each of the outer edges of the arched plate 2, whilst the roller 5 is half-way between the two other rollers and is so placed that the upper part of the conveying cloth 3 is kept at a suitable distance from its lower part. This latter part will rest against the upward arched plate 2, the holes of which are so placed that, in the direction in which the conveying cloth 3 travels, they completely cover one another. In this way the ammonia gas in the box-shaped part 1 can reach the entire surface of the print when it is carried by the conveying cloth 3 over the upward arched plate 2.

For the feeding-in of the prints there is a table 7, between which and the roller 4 the prints are pushed in. They are then caught by the conveying cloth 3 and, owing to the greater friction between the rubber cloth and the paper than between the latter and the smooth arched plate 2, are carried forward over it. The developed prints are fed out at the opposite roller 6, where a device for catching the fully developed prints may be arranged.

The caustic ammonia used for development is filled through an aperture corked with a plug 8 into a container 9, provided with a tapping tube 10, which is furnished with a shut-off valve 11. From the said valve 11 a tube 12 leads down into a needle valve 13, as shown in detail in Fig. 4. The needle valve consists of a valve box 14, one part of which is extended into a nozzle 15. Within the latter there is a valve needle 16, which at its end opposite to the nozzle 15 is provided with a threaded part 17, for which there is a threaded aperture in the valve box 14. On the other side of the said threaded part 17 there is a valve spindle 18, provided at its end with a milled nut 19. On the valve box 14 there is a gland 20, which is threaded in the said box and surrounds the valve spindle 18. In the space 21 formed between the latter and the gland 20, a suitable packing material, to prevent the escape of the caustic ammonia, is inserted. The container 9, as shown by Fig. 1, is placed comparatively high relatively to the needle valve 13, so that the caustic ammonia flowing out through the nozzle 15 is minutely divided. The valve box 14 is threaded in a T-pipe 22, which is connected on the one hand to the box-shaped part 1 (see Fig. 1) and on the other hand to a tube 23, which, in turn, is connected to the suction side of a fan 24. The latter is driven, with the aid of a belt 25, by an electric motor 26.

The outlet side (pressure side) of the fan is connected to a whirling pipe 27, which, with a flange 28, is in turn connected to the plane gable-end of the box-shaped part 1, and which is illustrated in detail in Fig. 3. Within the said pipe 27 is arranged a spirally twisted plate 29, by which a rotary motion is imparted to the air issuing from the fan 24, mingled with ammonia gas and minute particles of water, so that it is thoroughly mixed with the finely divided caustic ammonia, before it passes into the superheater 30, which is illustrated in detail in Fig. 2.

In the superheater 30 are inserted a number of tubes 31, containing electric heating units (not shown in the drawing). When the air thoroughly mixed with finely divided caustic ammonia passes into the superheater through the inlet pipe 32 in the direction indicated by the arrow, it impinges against a cone 33, which presses out the air towards the tubes 31. The air then sweeps along these tubes, turns and issues from the superheater 30 through the outlet pipe 34, the mouth of which is close to the under side of the cone 33. The circulation of the air within the superheater 30 is indicated by the arrows in Fig. 2.

The motor 26 and the electric heating units in the superheater 30 are operated by a single switch 35, which, however, can only be worked when the shut-off valve 11 under the ammonia container 9 is closed. For this purpose the said valve is provided with a projection 36, which actuates a locking arm 37, which arm, when the valve 11 is open, prevents the operation of the switch 35. When the valve 11 is closed, the projection 36 presses down one end of the locking arm 37, the other end of which is then lifted, thus releasing the switch 35.

The way in which the apparatus works is as follows. When the container 9 has been filled with caustic ammonia, the current is closed, whereupon the motor is started and the heating units in the superheater 30 begin to get heated. The valve 11 is then opened, whereupon the tube 12 is filled with caustic ammonia down to the needle valve 13. This actuates the locking arm 37, so that the switch 35 cannot be operated. The motor 26 drives the fan 24, which sucks in air from the interior of the box-shaped part 1. The air passes first through the T-pipe 22, and then sweeps past the nozzle 15 of the needle valve 13, carrying with it the finely divided caustic ammonia issuing therefrom. The air mixed with the ammonia passes through the tube 23 into the fan 24, which presses the air into the tube 27, where, as above mentioned, a rotary or whirling motion is imparted to it, so that it is thoroughly mixed with the finely divided caustic ammonia before entering the superheater 30. In the latter the minute drops of water carried along by the air are vaporized, so that the mixture issuing through the outlet pipe 34 and entering the box-shaped part 1 consists of air, ammonia gas and water vapor. The ammonia gas has thus been mixed with a suitable amount of water vapor, so that its degree of humidity as well as the temperature are suitably adapted for the development of the sensitive film, consisting of diazo compounds, on the printing paper. Care, however, must be taken that the heating units are so regulated as to impart the right temperature to the air passing through. Obviously, the capacity of the fan 24 must be properly adjusted for the purpose.

The mixture of air, ammonia gas and water vapor in the box-shaped part 1 is again sucked through the T-pipe 22 past the needle valve 13 into the fan 24 in the manner above indicated. Thus no new air is supplied: the existing air in the system is merely put into circulation. The needle valve 13 is so regulated that fresh ammonia gas and water vapor is supplied to the circulating mixture only in the degree that ammonia gas and water vapor are consumed in the development (being absorbed in the diazo compounds) or are possibly lost by leakage. The caustic ammonia issuing from the nozzle 15 of the needle valve 13, as already mentioned, is minutely divided, so that ammonia gas is liberated and heat is absorbed. When the air has thus passed the needle valve 13, it is markedly cooled, whence it is of great importance that the heating units in the superheater 30 should be carefully regulated with a view to the greatest possible production of gas and the least possible condensate.

In order effectively to prevent condensation of water from the water vapor in the air within the box-shaped part 1, it has also been found desirable, for safety's sake, to place a number of electric heating units 38 along the wall of the said box-shaped part, in the manner indicated in Fig. 1. These heating units should, of course, be coupled with those in the superheater 30.

It is obvious that the above-described and illustrated details and designs can be executed in many other ways without exceeding the scope of the invention. Thus, for example, the above described needle valve for the fine division of the caustic ammonia can, of course, be replaced by some other suitable device. Furthermore, the superheater may be constructed in many other ways than that shown, besides which it is not essential that the apparatus should be driven by electricity and quite automatically: it may be driven by hand or by a treadle.

I claim:

1. In an apparatus for developing sensitized paper by means of a vaporized ammonia-water mixture, the combination of means forming a developing chamber having a perforated wall over which the paper to be developed is adapted to be moved, a fan having its suction side connected by a conduit with said developing chamber, means for introducing caustic ammonia in a finely divided state into said conduit, conduit means connecting the pressure side of said fan with said developing chamber, said conduit means containing means for intimately mixing the air stream produced by said fan with the finely divided caustic ammonia introduced into said conduit, and means at the discharge end of said conduit means for heating the mixture of caustic ammonia and air to a temperature at which the caustic ammonia is converted into gaseous ammonia and water vapor.

2. In an apparatus for developing sensitized paper by means of a vaporized ammonia-water mixture, the combination of means forming a developing chamber having a perforated wall over which the paper to be developed is adapted to be moved, a fan having its suction side connected by a conduit with said developing chamber, means for introducing caustic ammonia in a finely divided state into said conduit, conduit means connecting the pressure side of said fan with said developing chamber, said conduit means containing a whirling pipe provided with a spirally twisted plate for intimately mixing the air stream produced by said fan with the finely divided caustic ammonia introduced into said conduit, and means at the discharge end of said conduit means for heating the mixture of caustic ammonia and air to a temperature at which the caustic ammonia is converted into gaseous ammonia and water vapor.

3. In an apparatus for developing sensitized paper by means of a vaporized ammonia-water mixture, the combination of means forming a developing chamber having a perforated wall over which the paper to be developed is adapted to be moved, a fan having its suction side connected by a conduit with said developing chamber, means for introducing caustic ammonia in a finely divided state into said conduit, conduit means connecting the pressure side of said fan with said developing chamber, said conduit means containing means for intimately mixing the air stream produced by said fan with the finely divided caustic ammonia introduced into said conduit, and a superheater within said developing chamber through which the mixture of caustic ammonia and air passes from said mixing means, said superheater being adapted to convert said caustic ammonia in the air stream into gaseous ammonia and water vapor.

4. In an apparatus for developing sensitized paper by means of a vaporized ammonia-water mixture, the combination of means forming a developing chamber having a perforated wall over which the paper to be developed is adapted to be moved, a fan having its suction side connected by a conduit with said developing chamber, means for introducing caustic ammonia in a finely divided state into said conduit, said means including a needle valve, having a discharge nozzle extending into said conduit, a container for holding a supply of caustic ammonia situated at a substantial height above said needle valve, and a feed tube connecting said container with said needle valve, conduit means connecting the pressure side of said fan with said developing chamber, said conduit means containing means for intimately mixing the air stream produced by said fan with the finely divided caustic ammonia introduced into said conduit, and means at the discharge end of said conduit means for heating the mixture of caustic ammonia and air to a temperature at which the caustic ammonia is converted into gaseous ammonia and water vapor.

5. In an apparatus for developing sensitized paper by means of a vaporized ammonia-water mixture, the combination of means forming a developing chamber having a perforated wall over which the paper to be developed is adapted to be moved, a fan having its suction side connected by a conduit with said developing chamber, an electric motor for driving said fan, means for introducing caustic ammonia in a finely divided state into said conduit, said means including a needle valve, having a discharge nozzle extending into said conduit, a container for holding a supply of caustic ammonia situated at a substantial height above said needle valve, a feed tube connecting said container with said needle valve, and a shut-off valve in said feed tube, conduit means connecting the pressure side of said fan with said developing chamber, said conduit means containing means for intimately mixing the finely divided caustic ammonia introduced into said conduit, a superheater within said developing chamber through which the mixture of caustic ammonia and air passes from said mixing means, said superheater being adapted to convert said caustic ammonia in the air stream into gaseous ammonia and water vapor, electric heating units in said superheater, a single electric switch for controlling both said electric motor and said heating units to simultaneously connect them with a source of current supply or disconnect them therefrom, and means operatively connecting said shut-off valve and said electric switch whereby the latter is adapted to be operated only when said shut-off valve is closed.

KURT ERIK BERGGREN.

REFERENCES CITED

The following references are of record in the file of this patent:

UNITED STATES PATENTS

| Number | Name | Date |
|---|---|---|
| 424,118 | Lofthouse | Mar. 25, 1890 |
| 1,759,484 | Langsner | May 20, 1930 |
| 1,878,279 | Langsner | Sept. 20, 1932 |
| 1,886,596 | Schlomer | Nov. 8, 1932 |
| 1,904,551 | Smith | Apr. 18, 1933 |
| 1,926,322 | Grinten | Sept. 12, 1933 |
| 1,994,735 | Vanet | Mar. 19, 1935 |
| 2,200,996 | Reed | May 14, 1940 |
| 2,379,932 | Schoepflin et al. | July 10, 1945 |

FOREIGN PATENTS

| Number | Country | Date |
|---|---|---|
| 664,373 | Germany | Aug. 25, 1938 |